(12) United States Patent
Panchaksharaiah et al.

(10) Patent No.: US 12,301,939 B2
(45) Date of Patent: May 13, 2025

(54) SYSTEMS AND METHODS TO INSERT ADDITIONAL CONTENT

(71) Applicant: Adeia Guides Inc., San Jose, CA (US)

(72) Inventors: Vishwas Sharadanagar Panchaksharaiah, Karnataka (IN); Vikram Makam Gupta, Karnataka (IN); Gyanveer Singh, Bihar (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 63 days.

(21) Appl. No.: 17/698,494

(22) Filed: Mar. 18, 2022

(65) Prior Publication Data

US 2023/0300416 A1  Sep. 21, 2023

(51) Int. Cl.
| | |
|---|---|
| *H04N 7/10* | (2006.01) |
| *H04N 21/234* | (2011.01) |
| *H04N 21/431* | (2011.01) |
| *H04N 21/466* | (2011.01) |
| *H04N 21/858* | (2011.01) |

(52) U.S. Cl.
CPC ... *H04N 21/4668* (2013.01); *H04N 21/23424* (2013.01); *H04N 21/4316* (2013.01); *H04N 21/858* (2013.01)

(58) Field of Classification Search
CPC ......... H04N 21/4668; H04N 21/23424; H04N 21/4316; H04N 21/858
See application file for complete search history.

(56) References Cited

U.S. PATENT DOCUMENTS

| | | | |
|---|---|---|---|
| 7,610,599 B1 * | 10/2009 | Nashida | H04N 21/440263 725/38 |
| 10,764,645 B2 * | 9/2020 | Chatter | H04N 21/8583 |
| 2001/0013125 A1 * | 8/2001 | Kitsukawa | H04N 21/4784 725/87 |
| 2008/0134043 A1 * | 6/2008 | Georgis | H04L 67/104 348/E7.071 |
| 2009/0300677 A1 * | 12/2009 | Zalewski | H04N 21/235 725/38 |
| 2014/0040244 A1 * | 2/2014 | Rubinstein | G06F 16/2423 707/722 |
| 2014/0059156 A1 | 2/2014 | Freeman et al. | |
| 2014/0229864 A1 * | 8/2014 | Eggink | G11B 27/34 715/753 |
| 2017/0171580 A1 * | 6/2017 | Hirsch | H04L 67/62 |
| 2017/0280196 A1 | 9/2017 | Thomas et al. | |
| 2021/0274256 A1 | 9/2021 | Kadam | |

\* cited by examiner

*Primary Examiner* — Annan Q Shang
(74) *Attorney, Agent, or Firm* — Haley Guiliano LLP

(57) ABSTRACT

Systems and methods are provided for performing an action associated with a recommendation. An input associated with a first content item is received and a type associated with the first content item is identified. A recommendation is identified based on the type, and an action associated with the recommendation is performed at a first computing device.

16 Claims, 10 Drawing Sheets

SYSTEMS AND METHODS TO INSERT ADDITIONAL CONTENT

BACKGROUND

The present disclosure is directed towards systems and methods for performing an action associated with a recommendation at a computing device. In particular, systems and methods are provided herein that identify a recommendation based on a type associated with a content item being output at a computing device.

SUMMARY

With the proliferation of media content streaming platforms, such as over-the-top (OTT) platforms like Netflix and Disney+, users are finding it increasingly difficult to find and access content items that are of interest to them. In part, this is due to the wide range of content items available to users, but also because existing content recommendation systems do not always provide content recommendations in a manner is that easily accessed by a user. Typically, users who are searching for a content item to view or listen to on a streaming platform will search for a content item on a home screen, and/or electronic program guide, of an application associated with the streaming platform. A user may search for an item by scrolling through thumbnails and descriptive text associated with different content items. In some examples, users may start consuming multiple content items in order to find a content item of interest. Manually browsing through content items, and consuming portions of content items, to find a content item that a user is interested in generates additional user interface requests to receive media content items, and additional requests to consume portions of selected content items, many of which will not be of use to the user, because they are manually browsing to find content items of interest. As the user will ultimately discard/skip over a lot of the content that is not relevant in order to find relevant content, network bandwidth and/or processing resources are wasted during the delivery of content that is not relevant.

To overcome these problems, systems and methods are provided herein that are capable of performing an action associated with a recommendation at a computing device. In particular, systems and methods are provided herein that identify a recommendation based on a type associated with a content item being output at a computing device.

Systems and methods are described herein for performing an action associated with a recommendation at a computing device. In accordance with some aspects of the disclosure, a method is provided. The method includes receiving input associated with a first content item, and identifying a type associated with the first content item. A recommendation is identified based on the type, and an action associated with the recommendation is performed at a first computing device.

The first content item may be generated for output at the first computing device, and receiving the input associated with the first content item may further comprise receiving an input associated with a segment of the first content item. Identifying the type associated with the first content item may further comprise identifying a type associated with the segment of the first content item. Performing the action may further comprise generating a recommendation for a second content item for output at the first computing device. The recommendation may be an interactive recommendation. On receiving an input associated with the interactive recommendation at the first computing device, performing the action may further comprise generating the second content item for output at the first computing device.

In an example system, a user may select a movie for consumption at a Netflix application running on a smart television. A fast-forward input may be provided via a remote control associated with the smart television, and a subsequent play input may be provided via the remote control. In response to identifying that a first segment of the content item is being fast-forwarded and a second segment is being played, a type, for example a genre, associated with the segment that is being fast-forwarded may be identified and/or a type associated with the segment that is being played may be identified. In this example, a comedy segment may be fast-forwarded, and an action segment may be played. A recommendation based on the comedy segment being fast-forwarded (i.e., a recommendation that does not comprise a comedy content item) and/or based on the action segment being played (i.e., a recommendation directed towards an action content item) may be identified. For example, a recommendation for an action movie may be identified. In another example, a first segment, associated with action, may be played and a recommendation may be identified based on the action segment being played, again, for example, a recommendation for an action movie. If a user subsequently fast-forwards another segment of the content item, in either of the aforementioned examples, the recommendation for the action movie may be generated for display at the smart television. In some examples, the content item that was being fast-forwarded may be paused while the recommendation is being generated for display. In other examples, the recommendation may replace a segment of the content item. For example, if a segment that is being fast-forwarded is associated with comedy, then that segment of the content item may be replaced by the recommendation. In some examples, a user may be able to interact with the recommendation to initiate playback of the recommended content item. In this way, a relevant recommendation is presented to the user, reducing the need for a user to browse through many content items and hence reducing the bandwidth and computing resources associated with identifying and delivering a relevant content item to a user.

A manifest file may be received at the first computing device, and the manifest file may comprise a link to the recommendation. Performing the action may further comprise requesting the recommendation, via the link, at the first computing device. In some examples, the content item may be delivered via dynamic adaptive streaming over HTTP (DASH), Apple HTTP live streaming (HLS), Adobe HTTP dynamic streaming (HDS), and/or Microsoft smoot streaming (MSS). The manifest file may be a manifest file in accordance with a standard associated with, for example, DASH, HLS, HDS and/or MSS. The manifest file may be received from, for example, a content delivery network (CDN) associated with an OTT platform. In some examples, the links may point to servers within the CDN associated with the OTT platform. In other examples, the links may point to servers outside the CDN associated with the OTT platform.

A second computing device may be associated with the first computing device, and receiving the input associated with the first content item may further comprise receiving the input at the second computing device to request the first content item. Performing the action may further comprise generating a list of content items associated with the recommendation. In an example system, a smart speaker may be paired with a smart television. A user may issue a command, such as "List action movies." This command may be transmitted to the smart television, where an application running on the smart television, for example an application associated with an OTT platform, may generate a list of action movies. In this way, if the user proceeds to access the application, a list of relevant recommendations is ready to present to the user, without requiring any additional user input.

Receiving the input associated with the first content item may further comprise receiving input corresponding to a plurality of content items. Identifying the type may further comprise identifying a type associated with at least a subset of the plurality of content items.

The input associated with the first content item may be analyzed to determine a content delivery service associated with the first content item, and at least a part of the input may be transmitted to a profile associated with the content delivery service. Identifying a recommendation based on the type may further comprise identifying the recommendation based on the profile and the content delivery service.

At least a part of the input may be transmitted to a plurality of content delivery services, and a response may be received from at least a subset of the content delivery services. The responses may be aggregated at the first computing device, and identifying a recommendation based on the type may comprise identifying the recommendation based on the aggregated responses in addition to the type.

At least a part of the input may be transmitted to a content delivery service, and performing the action may further comprise pre-caching, via an application associated with the content delivery service, a portion of a second content item based on the recommendation.

At least a part of the input may be transmitted to a plurality of content delivery services, and a bid to recommend a second content item from at least a subset of the plurality of content delivery services may be received at a bidding platform. Identifying the recommendation may further comprise identifying the recommendation based on the received bids, and performing the action may further comprise generating a recommendation for the second content item for output at the first computing device.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 9:
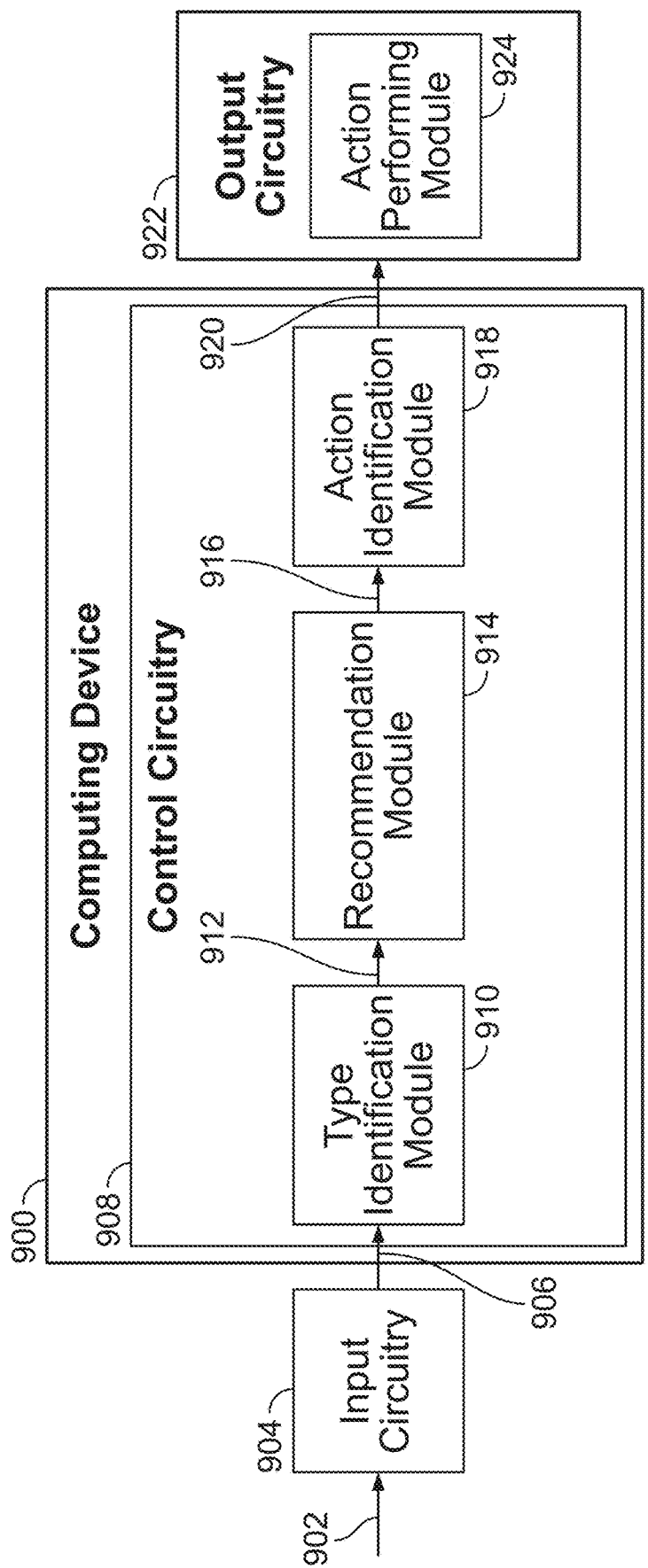
Figure 10:
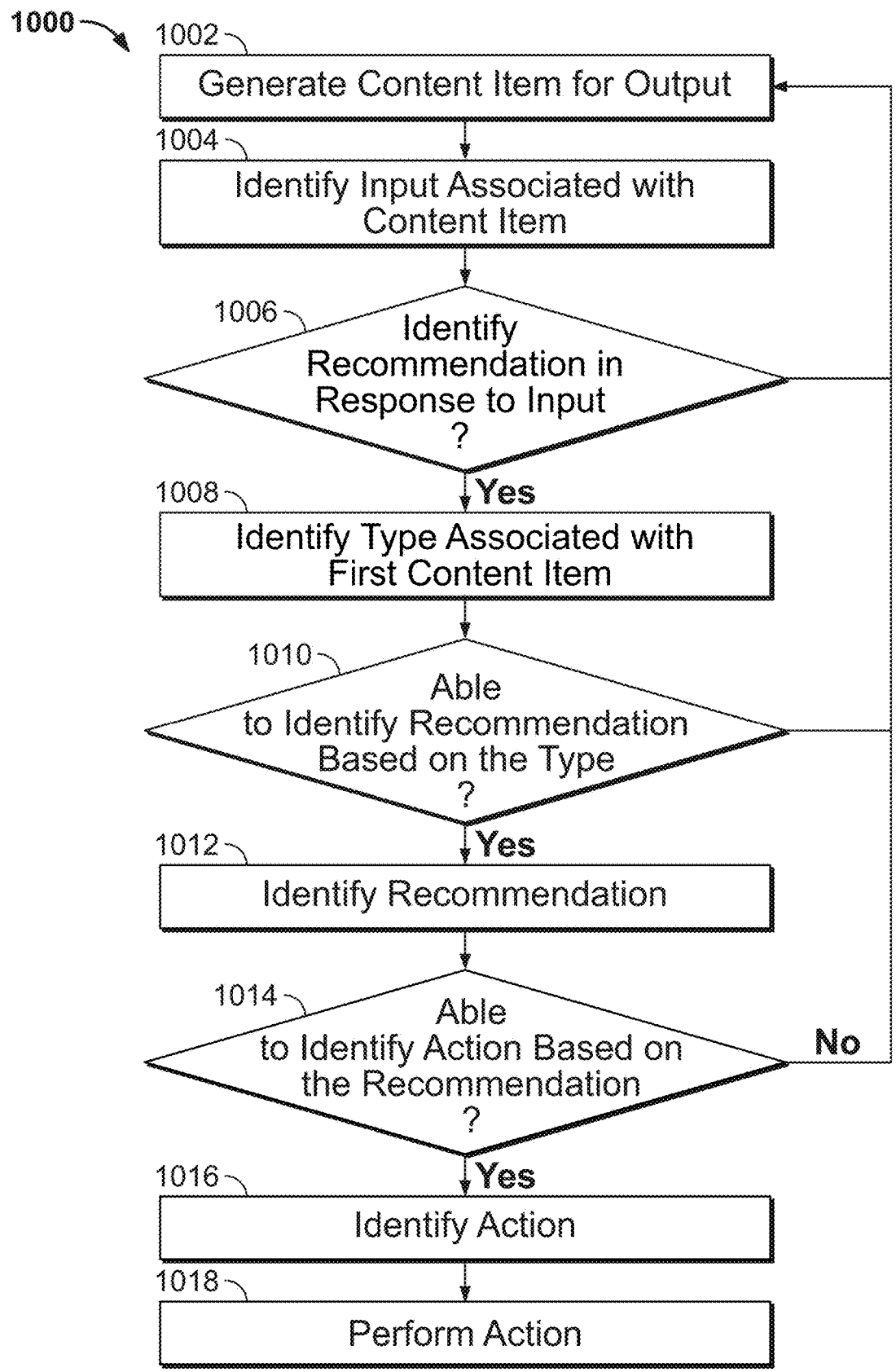

FIG. 9 shows a block diagram representing components of a computing device and data flow therebetween for performing an action associated with a recommendation at a first computing device, in accordance with some embodiments of the disclosure; and FIG. 10 shows a flowchart of illustrative steps involved in performing an action associated with a recommendation at a first computing device, in accordance with some embodiments of the disclosure.

DETAILED DESCRIPTION

Systems and methods are described herein for performing an action associated with a recommendation at a computing device. An input may comprise any input received at a computing device. This may comprise an input received via a remote control that is in communication with a computing device via infrared, Bluetooth and/or Wi-Fi. An input may comprise a touch event received via, for example, a touchscreen of a computing device. In another example, an input may be received via a mouse and or keyboard in communication with a computing device. The input may also be an audible and/or spoken input received via, for example, a microphone in communication with the computing device.

A content item may comprise a number of portions, segments and/or chapters. These segments may be identified in metadata associated with the content item and may include titles and/or descriptions related to the content of the portion. The content item may be of any suitable known format. One example of a suitable media content item is one that complies with the MPEG DASH standard. Media content items include audio, video and/or any other media content. Audio includes audio-only content, such as podcasts, stories and music. Video includes audiovisual content such as movies and/or television programs. An over-the-top (OTT) content and/or content streaming platform may be accessed via a website and/or an app running on a computing device and may receive any type of media content, including live media content and/or on-demand media content. Content items may, for example, be streamed to physical computing devices. In another example, content items may, for example, be streamed to virtual computing devices in, for example, a virtual environment and/or the metaverse.

A type may comprise a genre associated with a content item and/or a segment of a content item. A genre includes a style and/or category associated with the content item and/or segment of the content item. Example genres include action, adventure, comedy, drama, fantasy, horror, mystery, and/or science fiction. A genre may be determined via, for example, metadata associated with the content item and may include titles and/or descriptions related to the content of the portion. In other examples, frames and/or audio tracks associated with the content item and/or the segment of the content item may be analyzed by, for example, a trained algorithm to determine a genre associated with a content item and/or a segment of a content item. In some examples, the type may also comprise a service, such as an OTT service, for delivering a content item. For example, the type may comprise a Netflix content item. In other examples, the type may relate to a category of related content items, for example, the type may be doctor, superhero, and/or farm, as a doctor(s), superhero(es) and/or farm(s) feature prominently in a content item and/or segment of a content item.

A recommendation may relate to a single content item, or a plurality of content items. A recommendation may comprise a plurality of frames of a content item. In other examples, a recommendation may be an audio-only recommendation. A recommendation may comprise a text-only recommendation and/or may additionally include one or more thumbnails representing one or more content items. A recommendation may comprise a list of content items. A recommendation may comprise a link that, when selected, enables a different content item to be generated for output at a computing device.

Performing an action at a computing device may comprise playing a relatively short content item (for example, a plurality of frames and/or an audio track) while an initial content item is paused and/or may comprise replacing a segment of an initial content item. Performing an action at a computing device may also include caching a content item at, for example, an edge server and/or on a computing device. Performing an action at a computing device may also include requesting data at a computing device in anticipation of an action that may be performed at the computing device.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
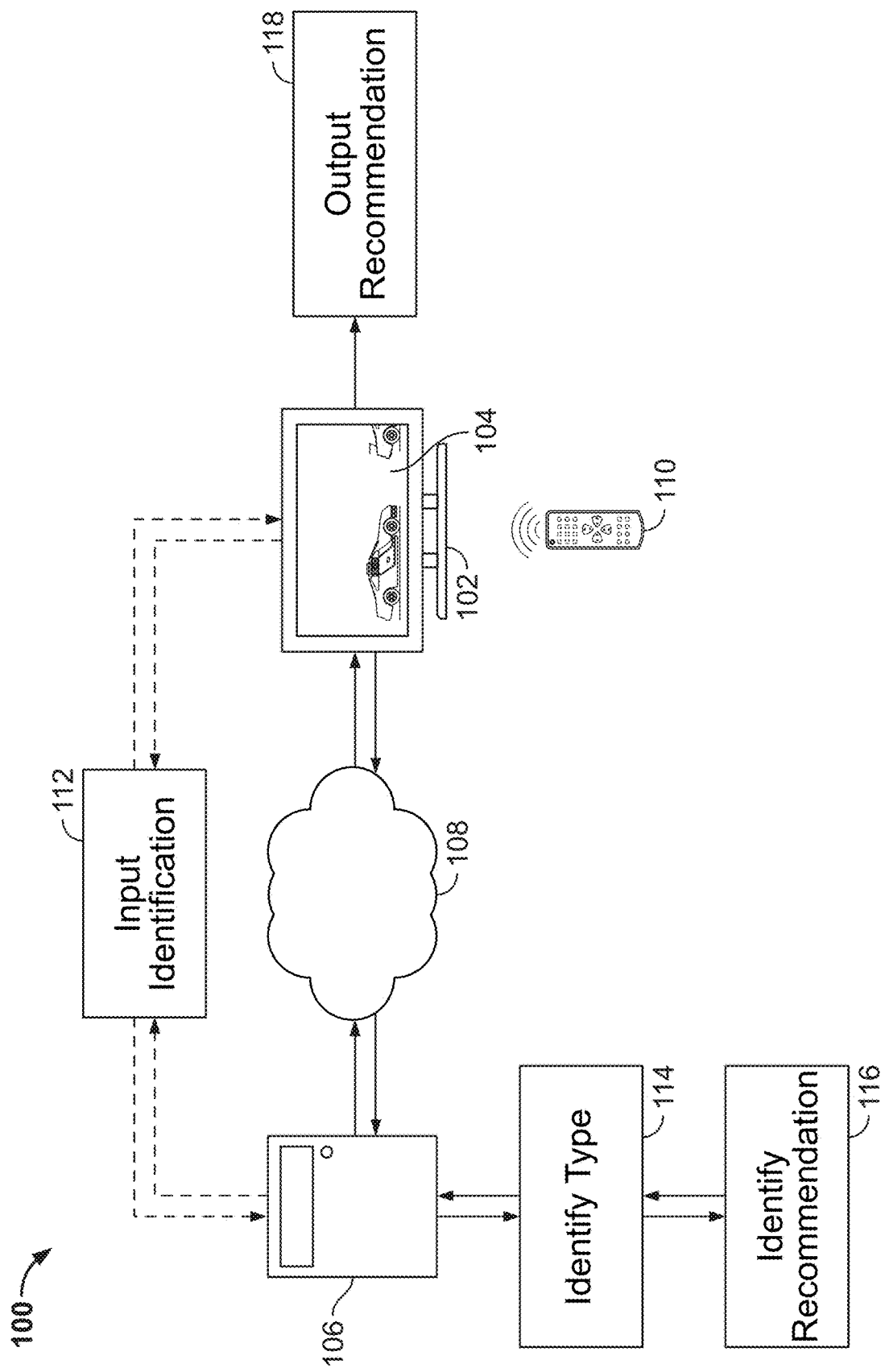
FIG. 1 shows an example environment in which an action associated with a recommendation is performed at a first computing device, in accordance with some embodiments of the disclosure.

FIG. 1 shows an example environment in which an action associated with a recommendation is performed at a first computing device, in accordance with some embodiments of the disclosure. The environment 100 comprises a computing device, such as smart television 102, that generates for output a content item 104. The content item may be received via a content streaming service, such as via an OTT provider, and may be displayed on the smart television 102 via, for example, an application associated with the OTT provider. The smart television 102 communicates with a server 106 via a network 108, such as the internet. The network 108 may comprise wired and/or wireless means. The smart television 102 receives an input via remote control 110. The input may comprise, for example, a fast-forward and/or a play command. On receiving the input, the input is identified 112. The dashed lines indicate that this identification may occur at the smart television 102 and/or the server 106. The input may be identified by comparing a command code received via the remote control 110 to a database of command codes. In another example, the application associated with the OTT provider may transmit an indication of the command and/or may provide an application programming interface (API) to enable the identification of commands received at the OTT application.

In response to identifying a relevant input, in this example, a type associated with the content item and/or a segment of the content item is identified 114 at the server 106. In other examples, the type may be identified at the smart television 102 and may be transmitted via the network 108 to the server 106. A fast-forward input may be provided via the remote control 110, and a subsequent play input may be provided via the remote control 110. In response to identifying that a first segment of the content item is being fast-forwarded and a second segment is being played, the type, for example a genre, associated with the segment that is being fast-forwarded may be identified 114 and/or a type associated with the segment that is being played may be identified 114. In this example, a comedy segment may be fast-forwarded, and an action segment may be played. In another example, a first segment, associated with action, may be played. A recommendation is identified 116, based on the identified type, at the server 106 and is transmitted, via the network 108, to the smart television 102. A recommendation based on the comedy segment being fast-forwarded (i.e., a recommendation that does not comprise a comedy content item) and/or based on the action segment being played (i.e., a recommendation directed towards an action content item) may be identified. For example, a recommendation for an action movie may be identified. In another example, a recommendation may be identified based on the action segment being played, again, for example, a recommendation for an action movie. On receiving the recommendation, the smart television 102 generates the recommendation for output 118. In some examples, the recommendation may be generated for output 118 in response to receiving a subsequent input, for example, a second and/or subsequent command to fast-forward and/or skip a portion of the content item 104. The recommendation may comprise, for example, a short clip that is generated for display at the smart television 102. The content item 104 may be paused while the recommendation is being output. In other examples, the recommendation may replace a segment of the content item 104. In another example, the type may be identified 114 based on, for example, a plurality of inputs.

In response to determining that a user of the computing device did not find any new content to consume, for example, based on browsing and/or scrolling behavior identified at the computing device, then a playback session may automatically be registered with a content promotion service (CPS) that monitors actions received at the computing device with respect to fast-forwarding and/or skipping a content item in real time. The monitored actions may be used to determine a type (for example, genre) of the segments being skipped and may determine the type of segments the user is currently consuming. In some examples, a user profile associated with, for example, an OTT service may already comprise this data, for example, collected from previous sessions. This allows similar segments in the recommended content to be presented in the form of an advertisement, with the option to start playing the recommended content right from the advertisement, for example via a "play now" button linked to a movie. For example, a viewer who re-watches an episode of "Breaking Bad" and skips right to the scenes featuring DEA busts and/or gang fights might also be interested in the show "Narcos." If the advertisement features scenes similar to the scenes that a user is watching in the current content item, this could trigger an impulse watching of the recommended show. Similarly, the advertisements may be related to content that is not yet available; but showing similar segments from such content may be a good promotion for the new content. Such promotions may, for example, present an "Add to Playlist" option. The CPS service may rely on tags associated with a segment, or scene, (e.g., action, horror, suspense and/or comedy) to quickly identify segments that should be promoted. Other known techniques such as video processing and/or feature extraction may be utilized by the CPS to identify promotional segments that would likely be of interest to the viewer.

The CPS may collect data in real time (if not already available) with respect to the segments being skipped, the segments being watched and/or the segments being re-watched. Therefore, the CPS might need to send a player associated with, for example, an OTT application an updated manifest file that contains links to the new promotion. In addition, client-side promotion insertion may also be used. The player may make a call to the CPS for a promotion via, for example, an additional software component on the player side. The CPS may notify the player when it is ready to start offering promotions, and such a notification can trigger the player to request a promotion, pause the current content playback, play the promotion, and resume playback of the original content.

Figure 2:
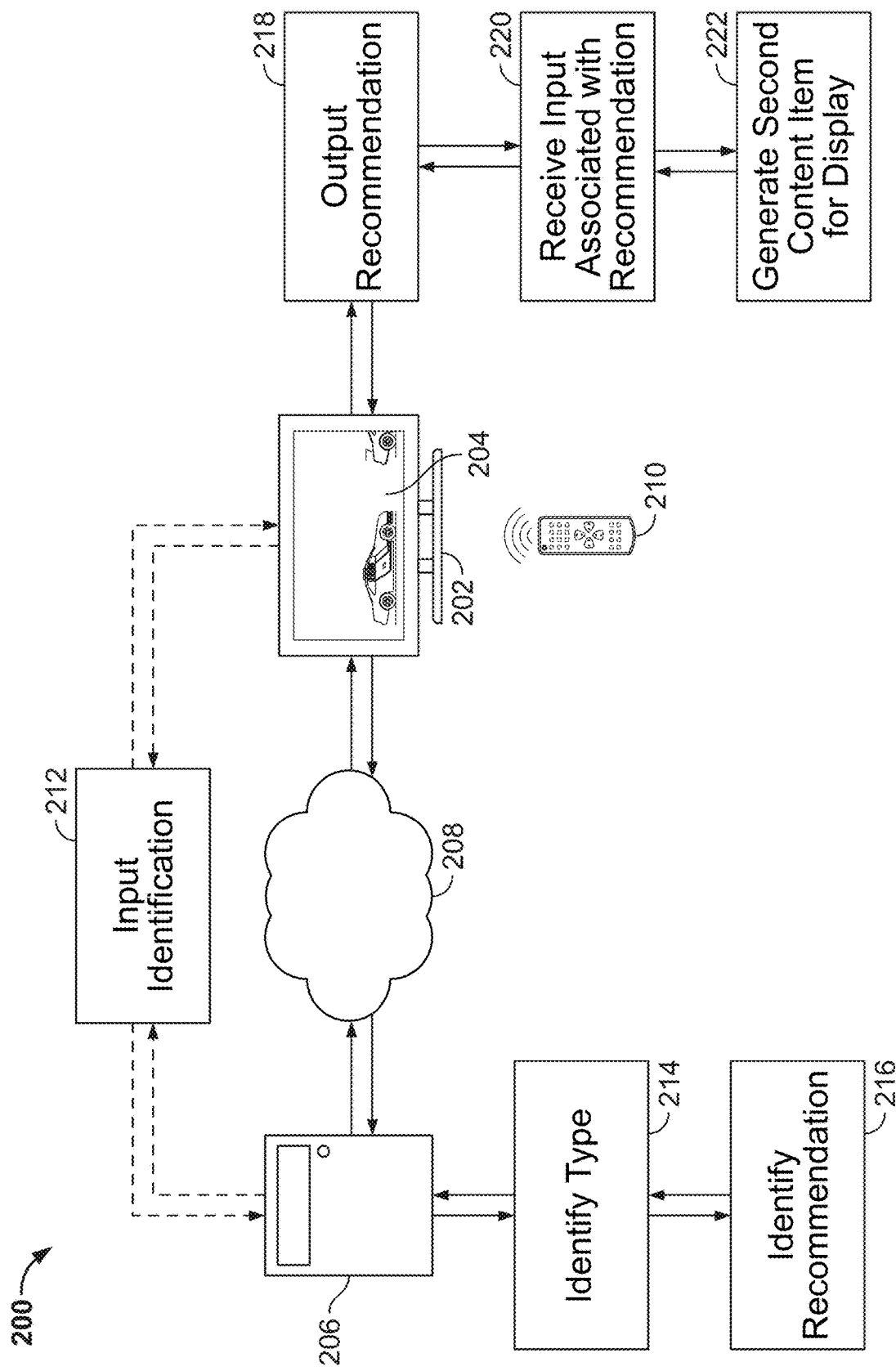
FIG. 2 shows another example environment in which an action associated with a recommendation is performed at a first computing device, in accordance with some embodiments of the disclosure.

FIG. 2 shows another example environment in which an action associated with a recommendation is performed at a first computing device, in accordance with some embodiments of the disclosure. In a similar manner to the environment depicted in FIG. 1, the environment 200 comprises a computing device, such as smart television 202, which generates for output a content item 204. The smart television 202 communicates with a server 206 via a network 208, such as the internet. The network 208 may comprise wired and/or wireless means. The smart television 202 receives an input via remote control 210. The input may comprise, for example, a fast-forward and/or a play command. On receiving the input, the input is identified 212. The dashed lines indicate that this identification may occur at the smart television 202 and/or the server 206.

In response to identifying a relevant input, in this example, a type associated with the content item and/or a segment of the content item is identified 214 at the server 206. In other examples, the type may be identified at the smart television 202 and may be transmitted via the network 208 to the server 206. A fast-forward input may be provided via the remote control 210 and a subsequent play input may be provided via the remote control 210. In response to identifying that a first segment of the content item is being fast-forwarded and a second segment is being played, the type, for example a genre, associated with the segment that is being fast-forwarded may be identified 214 and/or a type associated with the segment that is being played may be identified 214. In this example, a comedy segment may be fast-forwarded, and an action segment may be played. In another example, a first segment, associated with action, may be played. A recommendation is identified 216, based on the identified type, at the server 206 and is transmitted, via the network 208, to the smart television 202. A recommendation based on the comedy segment being fast-forwarded (i.e., a recommendation that does not comprise a comedy content item) and/or based on the action segment being played (i.e., a recommendation directed towards an action content item) may be identified, for example, a recommendation for an action movie may be identified. In another example, a recommendation may be identified based on the action segment being played, again, for example, a recommendation for an action movie. On receiving the recommendation, the smart television 202 generates the recommendation for output 218. In some examples, the recommendation may be generated for output 218 in response to receiving a subsequent input, for example, a second and/or subsequent command to fast-forward and/or skip a portion of the content item 204. The recommendation may comprise, for example, a short clip and/or a static frame that is generated for display at the smart television 202. The content item 204 may be paused while the recommendation is being output. In other examples, the recommendation may replace a segment of the content item 204. In another example, the type may be identified 214 based on, for example, a plurality of inputs. The recommendation may comprise a button and/or an icon associated with a second content item, different from the content item 204. An input associated with the recommendation is received 220, for example a selection, via the remote control 210, of the button and/or icon associated with the recommendation. In another example, the input may comprise a voice command that is received via a microphone (not shown) associated with the smart television 202. On receiving the input, a second content item is generated for display 222 at the smart television 202. The content item may be received via a content streaming service, such as via the same OTT provider as for the original content item 204. In other examples, the second content item may be received via a different OTT content provider.

Figure 3:
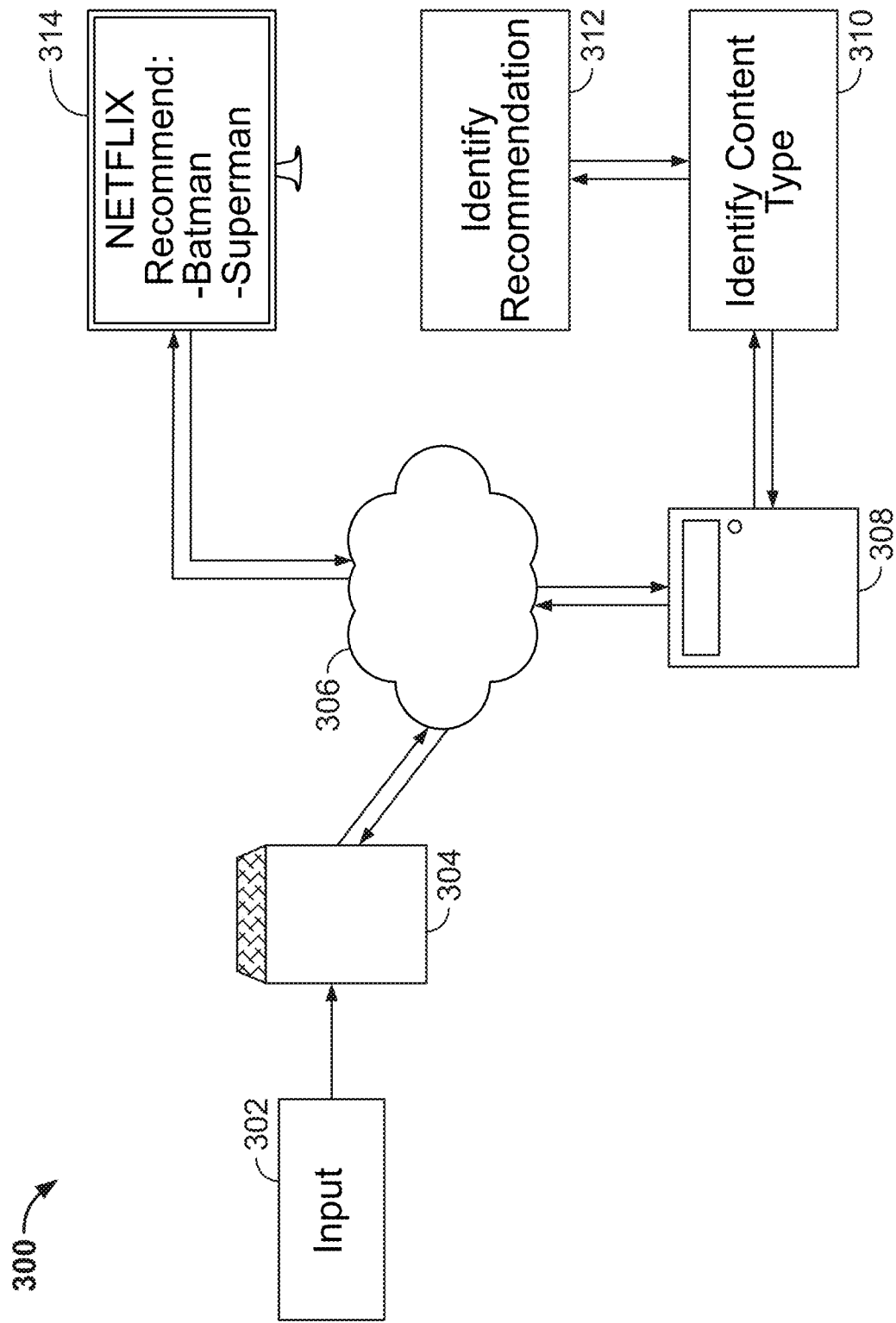
FIG. 3 shows another example environment in which an action associated with a recommendation is performed at a first computing device, in accordance with some embodiments of the disclosure.

FIG. 3 shows another example environment in which an action associated with a recommendation is performed at a first computing device, in accordance with some embodiments of the disclosure. The environment 300 comprises a smart speaker 304, a network 306, a server 308 and a smart television 314. An input 302 is received at the smart speaker 304. For example, the input 302 may comprise "List some action movies." The smart speaker 304 may request a list of action movies from a server and may output the list of action movies via, for example, a speaker. The smart speaker 304 may also transmit a representation of at least a portion of the input 302 via network 306 to a server 308. The server 308 may be the same, or a different, server from the server that generates the list of action movies. For example, the smart speaker may be an Echo Dot and may communicate with an Amazon server to receive a list of action movies for outputting. In addition, the smart speaker 304 may also transmit a representation of at least a portion of the input 302 to server associated with, for example, Netflix, where the following steps may be performed. At the server 308, a content type associated with the input 302 may be identified 310. In this example, the type may be "action," and a recommendation based on the type may be identified 312. In this example, the recommendation comprises generating a list of action movies. The list of action movies is transmitted from the server 308, via the network 306, to the smart television 314, where it is stored at an application on the smart television 314. For example, the list of recommendations may be stored at an application associated with an OTT service, so that on opening the application, a list of action movies, based on the input 302 to the smart speaker 304, is displayed. If, for example, the smart television 314 is switched off, the list may be cached at the server 308 until a request is received at the smart television 314 to load the application. On loading, the application may receive and display the list of recommended movies.

In an example system, a smart speaker, such as an Alexa device, may be paired with a computing device, such as a smart television, in order to control content playback (e.g., turn on television, pause and/or resume). Some computing devices, such as Samsung televisions and Apple TVs, include native virtual assistants (Bixby and Siri respectively). In one embodiment, smart speakers that are paired with a computing device and/or a native virtual assistant on the computing device (e.g., Siri on an Apple TV) can be used to transmit suggested content metadata to at least one service or module of a service (e.g., a recommendation module) in anticipation of the user wanting to watch television, i.e., prior to the user accessing a service (e.g., prior to a user launching an application associated with an OTT service). Such metadata can be used as a seed for recommendation in real and/or near real time. In a natural language processing system, intent may be determined when a query is received, so that the query is fulfilled. However, an intent with respect to a user's preference for a content item, genre of content, or content from a particular source (e.g., a television service and/or an app) at a given time may be determined prior to accessing a service, or even turning on the television. Such intent may be extracted from a conversation taking place around a smart speaker or any device with voice search capabilities (e.g., Siri running on an iPhone). Just as a wake word (e.g., "Hey Siri" and/or "Alexa") may be used to issue a query where the user expects results back, other wake words can be used to send a recommendation engine associated with a service a future and/or an upcoming intent. This enables a recommendation algorithm to refresh a recommendation, for example, re-ordering the content items in a recommendations section by re-adjusting the weights associated with the items or preparing a customized trailer that is generated or output when an application is launched. The virtual assistant may rely on a custom voice interaction model to determine whether an intent-to-watch request should be sent to any OTT application logic. For example, words or terms such as "watch," "movies," or titles of movies such "Venom," or "Carnage" that are mentioned in one sentence or phrase and/or within a predefined period may be good indicators of an intent to watch. The virtual assistant may still be in charge of the speech recognition/natural language processing to determine whether a valid intent to watch a request should be made to an OTT application logic. In some examples, OTT applications may subscribe to receive such data from the virtual assistant.

Figure 4:
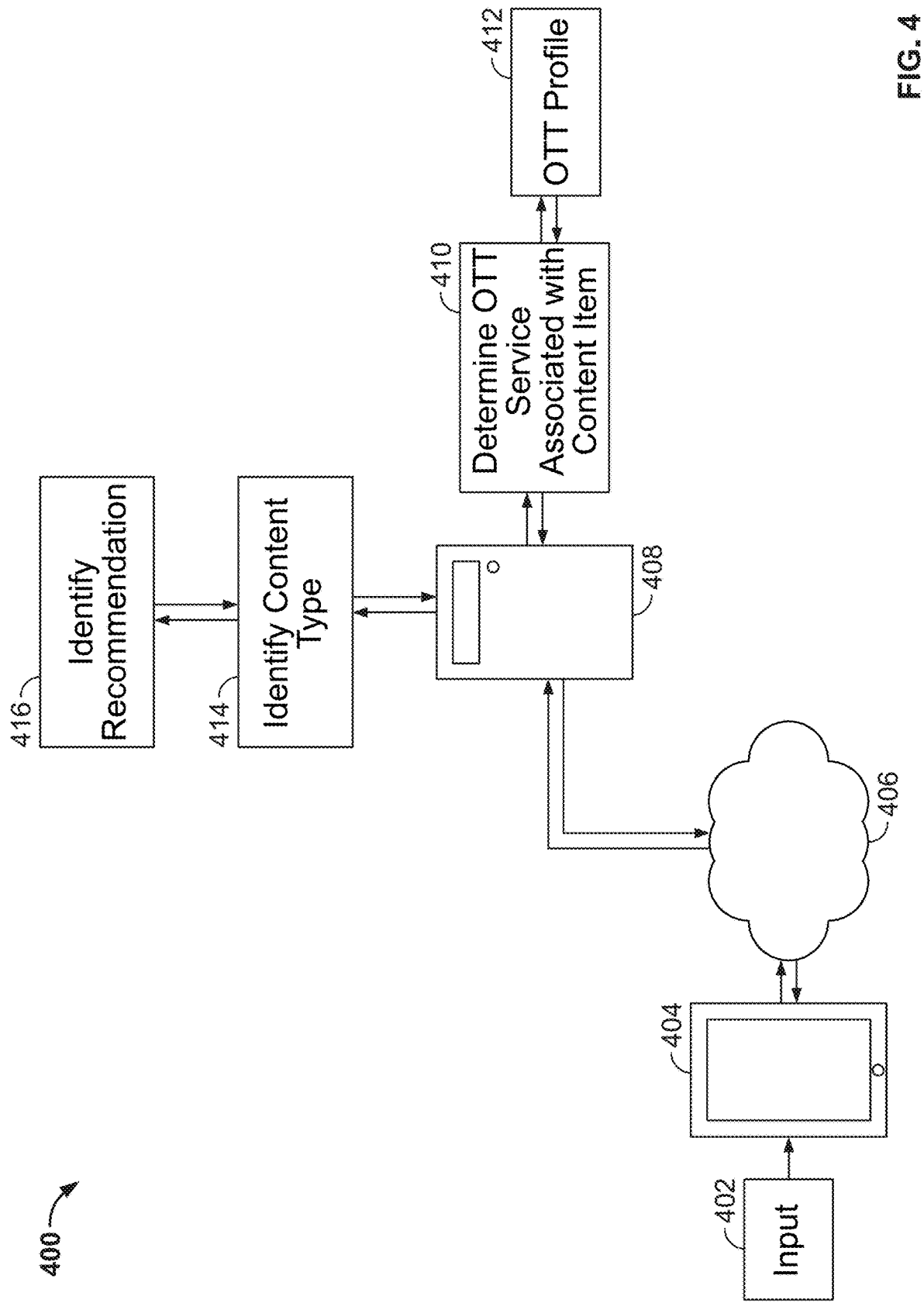
FIG. 4 shows another example environment in which an action associated with a recommendation is performed at a first computing device, in accordance with some embodiments of the disclosure.

FIG. 4 shows another example environment in which an action associated with a recommendation is performed at a first computing device, in accordance with some embodiments of the disclosure. The environment 400 comprises a smartphone 404, a network 406 and a server 408. An input 402 is received at the smartphone 404. For example, the input 404 may comprise "Play Batman." The smartphone 404 may transmit a representation of the input 402 via network 406 to a server 408. At the server 408, an OTT service associated with the content item may be determined 410. For example, if the movie "Batman" is only available via Amazon Prime, the associated OTT service will be Amazon Prime. A lookup service may be utilized to determine from which OTT service or services a content item is available. In the event of multiple OTT services being available, a tiebreaker may be utilized, for example, the cheapest OTT service may be selected and/or a service to which a profile associated with the smartphone 404 is subscribed may be selected. On determining a service associated with the content item, an OTT profile is identified 412. This profile may be accessed via the smartphone 404 and/or an output may be generated at the smartphone 404 requesting profile details. At the server 408, a content type associated with the input 402 may be identified 414. In this example, the type may be "action," and a recommendation based on the type may be identified 416. In this example, the recommendation comprises generating a list of action movies. The list of action movies is transmitted from the server 408, via the network 406, to the smartphone 404, where it is stored at an application on smartphone 404 that is associated with the OTT service. For example, the list of recommendations may be stored at the application associated with the identified OTT service, so that, in response to a search request, more relevant results may be displayed without lag, as relevant results are already on the smartphone 404 and do not need to be requested. If, for example, the smartphone 404 is switched off, the list may be cached at the server 408 until a request is received at the smartphone 404 to load the application.

For example, a family that normally watches a movie after dinner or during a specific day or time (e.g., weekends) may discuss what they wish to watch before turning on the television. For example, a family may discuss which American superhero movies they want to watch. If such "metadata" from the discussion, for example via a virtual assistant running on a computing device, can be sent to at least one recommendation engine ahead of time, then the users are likely to find the available superhero movies much faster, for example, when they turn on their television or launch a particular application. Such a query may be explicitly tagged with a no-response expected/needed parameter, since the user at this time is not expecting a response. This can be flagged in the POST request of a JavaScript object notation (JSON) body that is communicated to the OTT service. The OTT service can communicate (to the virtual assistant or a service that is associated with the virtual assistant) availability of content related to the metadata that was sent to the OTT service. For example, the response can include a list of the superhero movies available from an OTT service.

In an example, the intent to watch a request is sent to an identified OTT service, if the OTT service was identified in the analyzed speech. For example, if a virtual assistant was able to discern various entity types (via the use of named entity recognition models), then that information may be sent to the appropriate service. For example, a phrase "Maybe we should watch a Tom Hardy movie on hulu" indicates an app_entity (hulu), person_entity (Tom Hardy) and a type_entity (movie).

Figure 5:
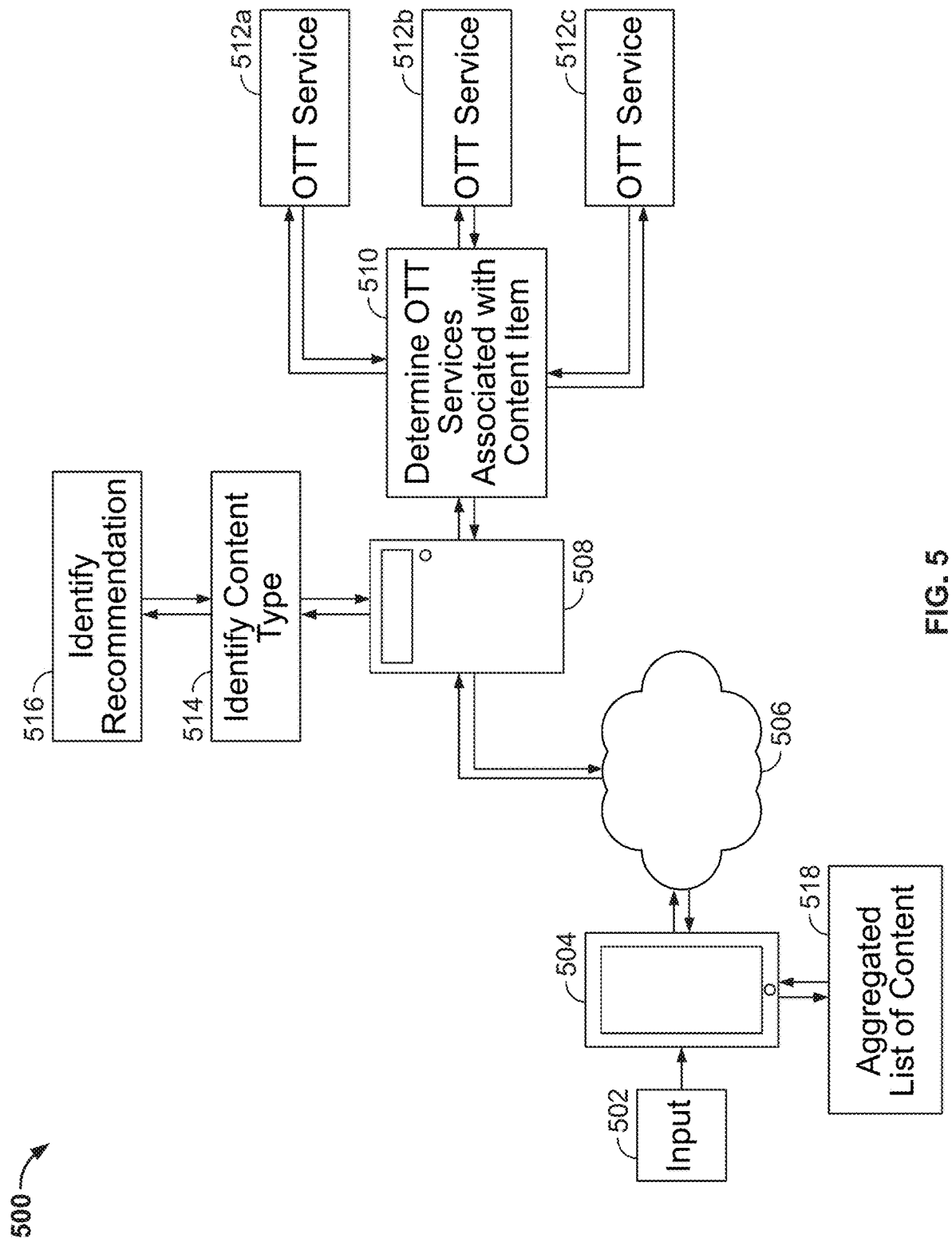
FIG. 5 shows another example environment in which an action associated with a recommendation is performed at a first computing device, in accordance with some embodiments of the disclosure.

FIG. 5 shows another example environment in which an action associated with a recommendation is performed at a first computing device, in accordance with some embodiments of the disclosure. In a similar manner to the environment depicted in FIG. 4, the environment 500 comprises a smartphone 504, a network 506 and a server 508. An input 502 is received at the smartphone 504. For example, the input 502 may comprise "Play 'Superman' movies." The smartphone 504 may transmit a representation of the input 502 via network 506 to a server 508. At the server 508, OTT services associated with the content item may be determined 510. For example, superhero movies may be available via Netflix, Disney+ and Amazon Prime. A lookup service may be utilized to determine from which OTT service or services 512a, 512b, 512c a content item is available. At the server 508, a content type associated with the input 502 may be identified 514. In this example, the type may be "superhero movies," and a recommendation based on the type may be identified 516. In this example, the recommendation comprises generating a list, or lists, of superhero movies from different OTT services 512a, 512b, 512c. The list, or lists, of superhero movies is transmitted from the server 508, via the network 506, to the smartphone 504, where they are aggregated 518 for display.

In some examples, metadata can be passed ahead of time to other services and/or applications installed on a computing device. Any responses from the services and/or applications can be aggregated by a virtual assistant associated with the computing device (i.e., a dedicated service that performs such tasks) and then be used to fulfill a future query (e.g., "Show me superhero movies"). For example, devices, such as Roku, with a universal search feature that can find a content item available from multiple services may rely on updated metadata from OTT providers that are participating in the search program. The OTT providers may inform Roku (via a back-end service) of items that were recently added and/or removed from their catalogues. The above example may serve to update metadata (in a database accessible to the universal search engine) with respect to content availability when there is a lag (e.g., Roku has not received catalog updates from an OTT service due to, for example, network issues).

When content items are aggregated, for example in 518 above, the sources may be ranked based on whether the source reported availability of a content item in, for example 4K or high definition (HD). A native virtual assistant running on a computing device may be aware of the device type that it is running on (e.g., 4K display, or an Apple TV that is connected to a 4K display). In this case, the virtual assistant can respond to a future user query reflecting this. In an example, historical streaming quality reported from a computing device may also be used to determine if the aggregated results should, for example, prioritize ultra-high definition (UHD) over 4K, even if, for example, a display associated with the computing device supports 4K resolutions. The aggregated results may enable a user to automatically transition from a displayed preview to the consuming of a content item via a deep link to an OTT service and/or an application associated with an OTT service.

Figure 6:
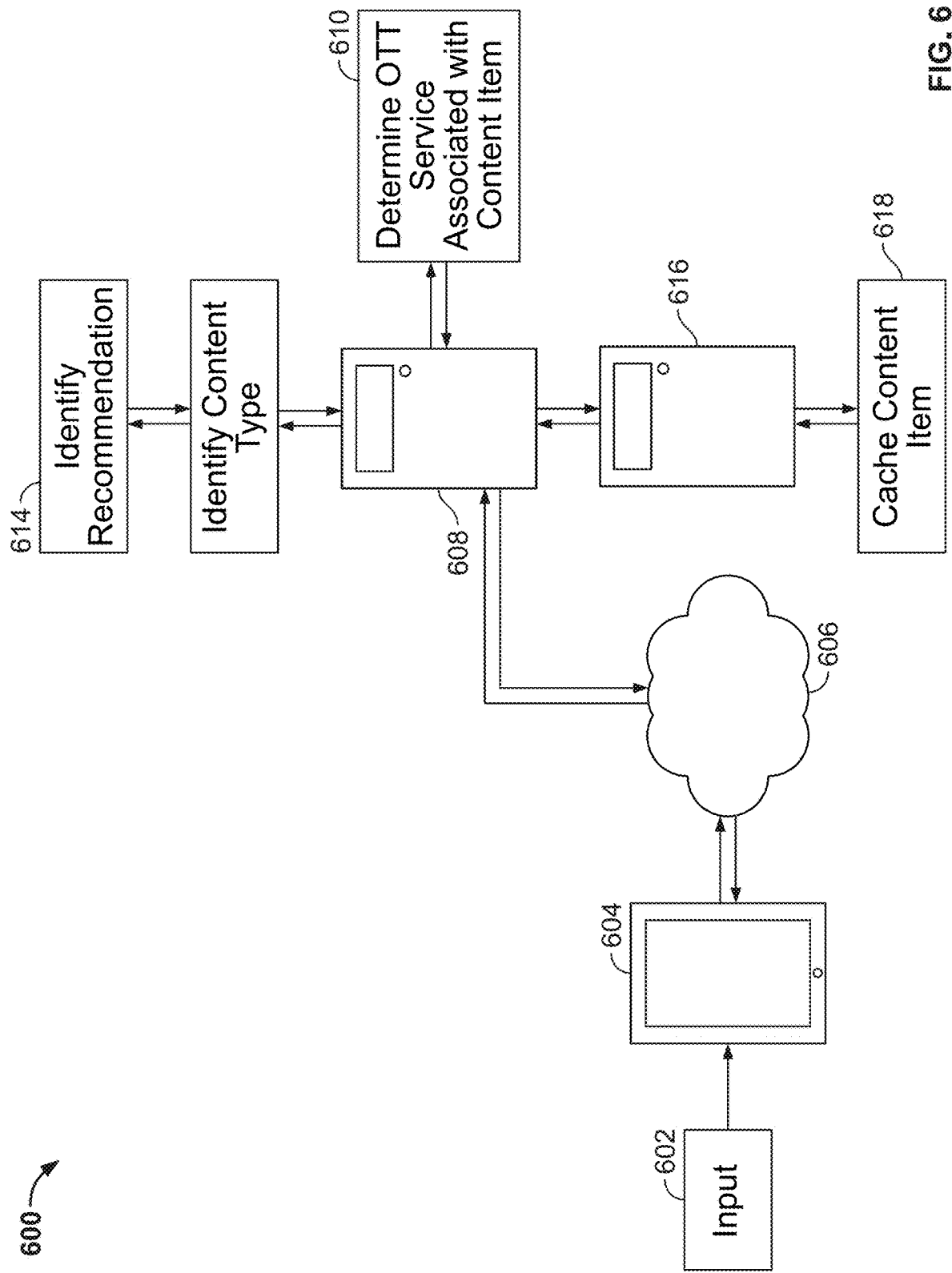
FIG. 6 shows another example environment in which an action associated with a recommendation is performed at a first computing device, in accordance with some embodiments of the disclosure.

FIG. 6 shows another example environment in which an action associated with a recommendation is performed at a first computing device, in accordance with some embodiments of the disclosure. In a similar manner to the environments depicted in FIGS. 4 and 5, the environment 600 comprises a smartphone 604, a network 606, a first server 608 and a second server 616. The second server 616 may be an edge server. An input 602 is received at the smartphone 604. For example, the input 404 may comprise "Play 'Euphoria'" The smartphone 604 may transmit a representation of the input 602 via network 606 to the first server 608. At the first server 608, an OTT service associated with the content item may be determined 610. For example, if the series "Euphoria" is only available via Netflix, the associated OTT service will be Netflix. A lookup service may be utilized to determine from which OTT service or services a content item is available. In the event of multiple OTT services being available, a tiebreaker may be utilized. For example, the OTT service that can deliver the content in the highest quality may be selected and/or a service to which a profile associated with the smartphone 604 is subscribed may be selected. At the first server 608, a content type associated with the input 602 may be identified 612. In this example, the type may be "drama," and a recommendation based on the type may be identified 614. In this example, the recommendation comprises instructing a second server 616 to cache 618 the content item. In some examples, other content items of the same type may be cached 618 at the server 616. In other examples, the first server 608 and the second server 616 may be the same physical server, and the determining and caching may take place at different virtual servers running on the same physical server. In other examples, the content item and/or content items, based on the identified type, may be cached at the smartphone 604 rather than a second server 616.

If an OTT application (e.g., Netflix) is aware of a potential intent-to-watch event, for example, via the methods describe above, then the application can utilize the intent-to-watch event to prioritize what to show on a landing page (for example, a first page displayed when the application is launched) of the application. For example, automatic playback of the most recent superhero movie (not watched by the user) can be displayed in the top third of the screen. In another example, the OTT service might pre-cache a portion of the content at an edge server (e.g., by relocating a portion of the content from the origin server to the edge server). In some examples, the OTT service may transcode a portion of a content item if just-in-time transcoding is a service supported by the OTT service.

Figure 7:
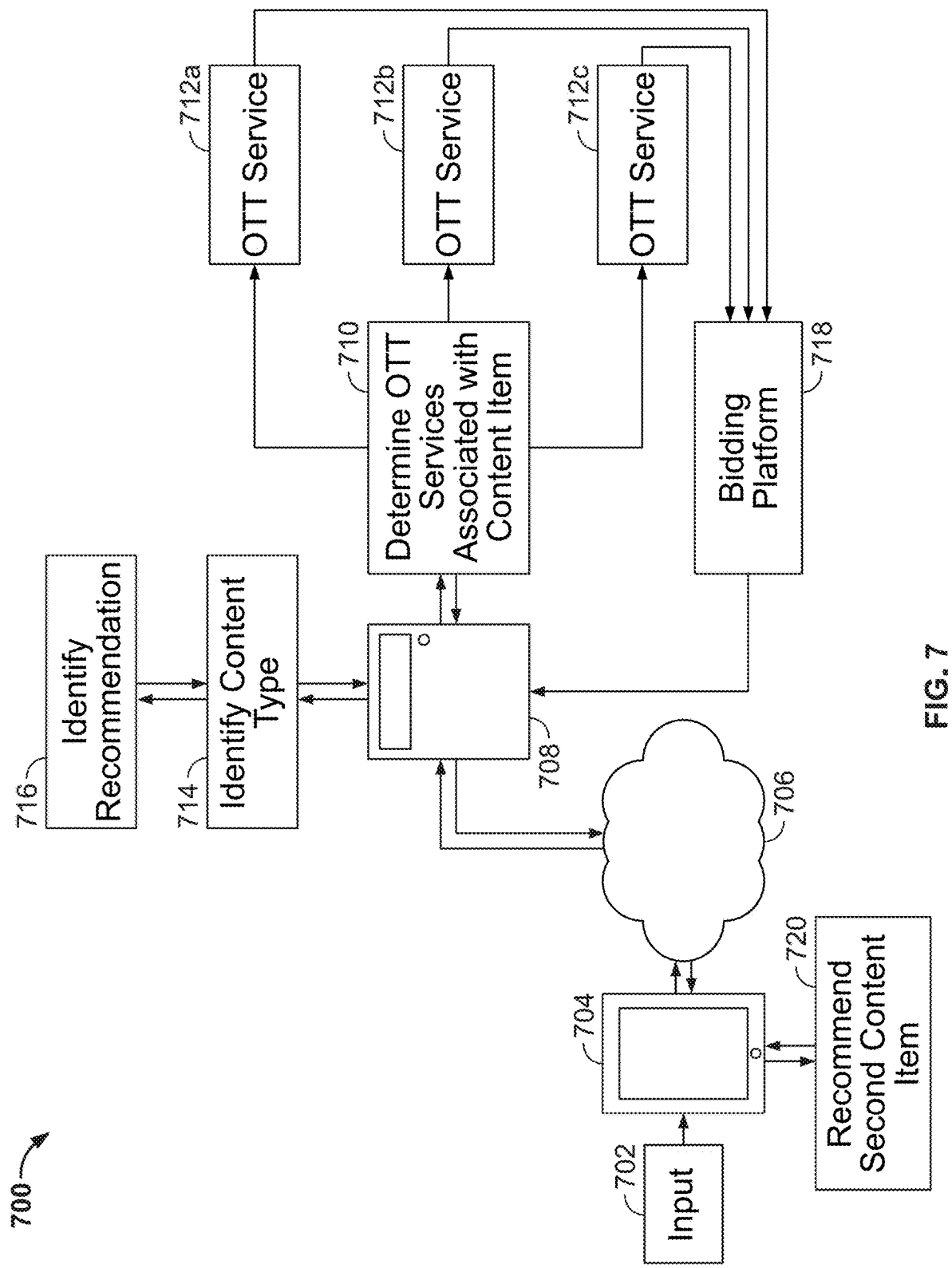
FIG. 7 shows another example environment in which an action associated with a recommendation is performed at a first computing device, in accordance with some embodiments of the disclosure.

FIG. 7 shows another example environment in which an action associated with a recommendation is performed at a first computing device, in accordance with some embodiments of the disclosure. In a similar manner to the environments depicted in FIGS. 4-6, the environment 700 comprises a smartphone 704, a network 706 and a server 708. An input 702 is received at the smartphone 704. For example, the input 702 may comprise "Play comedy movies." The smartphone 704 may transmit a representation of the input 702 via network 706 to a server 708. At the server 708, OTT services associated with the content item may be determined 710. For example, comedy movies may be available via Netflix, Disney+ and Amazon Prime. A lookup service may be utilized to determine from which OTT service or services 712a, 712b, 712c a content item is available. At the server 708, a content type associated with the input 702 may be identified 714. In this example, the type may be "comedy movies," and a recommendation based on the type may be identified 716. In this example, the recommendation comprises generating a request for bids for a relevant recommendation. The request is transmitted to a bidding platform 718, where the identified OTT services can bid for a relevant recommendation, for example a clip comprising an advertisement for a comedy content item, to be transmitted to the smartphone. The bidding platform may set criteria associated with the bids, for example a length of a recommendation, a quality of a recommendation and/or a size of a recommendation. On completion of the bidding process, a recommendation is identified and is transmitted, via the network 706, to the smartphone 704, where the recommendation is generated for output 720. As discussed above, the recommendation may be generated for output in response to a second and/or subsequent input at the smartphone 704.

In an example, different OTT providers may bid against each other to show their own version of a preview for a content item. For example, a movie that is most relevant to intent-to-watch metadata may be available from multiple providers. These multiple providers may bid for a portion of screen real estate that is configured to display a preview. The bidding may take place ahead of time, upon initiation of a computing device and/or launching an application. This is especially useful for content items that must be rented or purchased, when applications associated with the OTT providers are installed on the user device.

Figure 8:
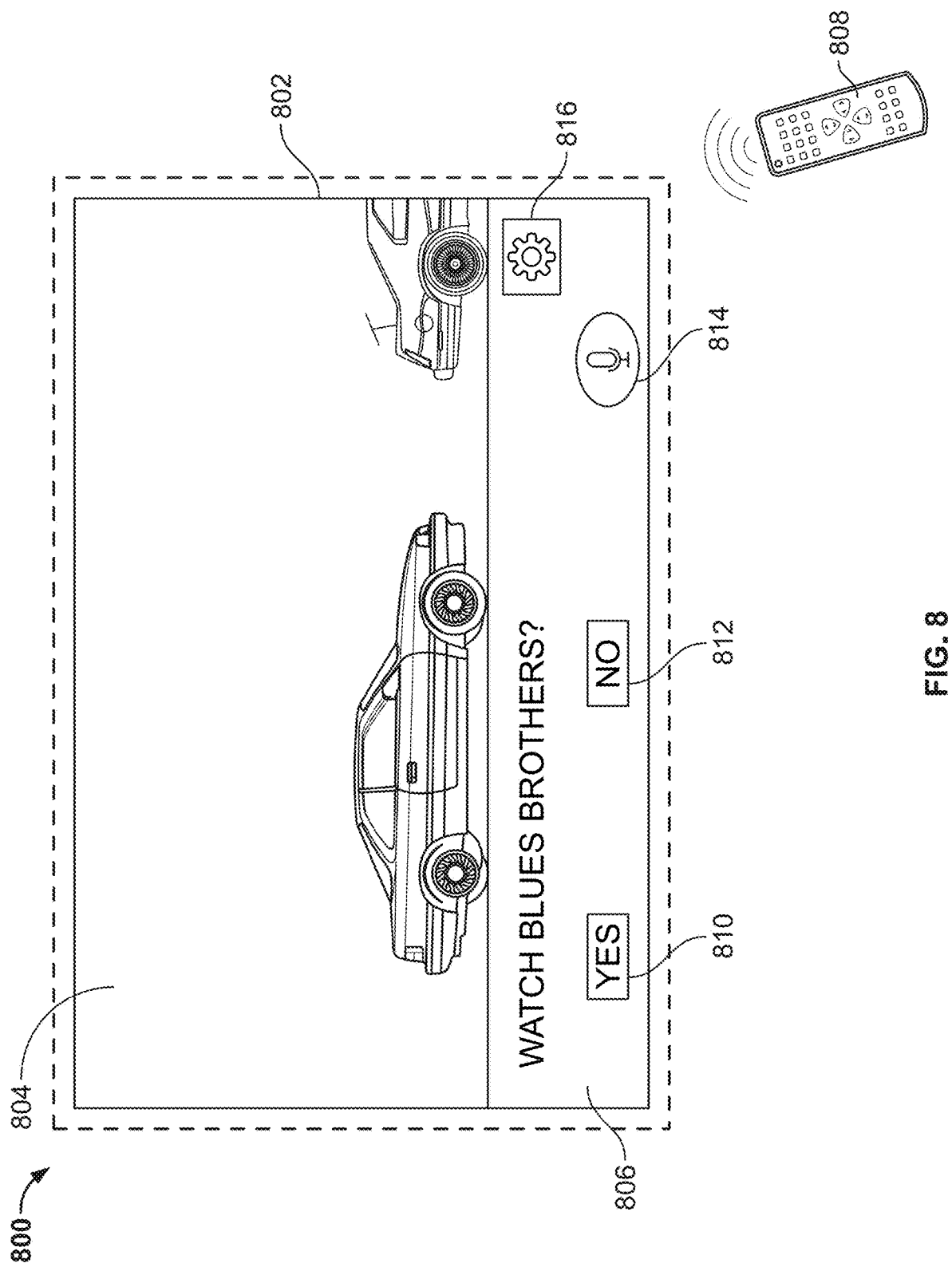
FIG. 8 shows an example recommendation at a first computing device, in accordance with some embodiments of the disclosure.

FIG. 8 shows an example recommendation at a first computing device, in accordance with some embodiments of the disclosure. The environment 800 comprises a smart television 802. The smart television 802 is generating a content item 804 for display. A recommendation 806 has been received at the smart television 802 and is being displayed at the smart television 802. In this example, the recommendation is to watch a content item, "Blues Brothers," related to a segment of the content item 804 currently being displayed at the smart television 802. A remote control 808 can be used to interact with the recommendation 806. For example, options "Yes" 810 and "No" 812 can be selected via the remote control 808. A microphone icon 814 may also be displayed as part of the recommendation, indicating that a voice command can be used to interact with the recommendation. For example, in addition to selecting "Yes" or "No," a voice command may be used to show additional recommendations, show a trailer associated with the recommendation and/or dismiss the recommendation 806. A settings icon 816 may also be selected, where settings such as "Show recommendations" and/or "Auto-play recommendations" may be selected.

FIG. 9 shows a block diagram representing components of a computing device and data flow therebetween for performing an action associated with a recommendation at a first computing device, in accordance with some embodiments of the disclosure. Computing device 900 (e.g., computing device 102, 202, 304, 404, 504, 604, 704, 802) as discussed above comprises input circuitry 904, control circuitry 908 and an output module 922. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received by the input circuitry 904. The input circuitry 904 is configured to receive user interface inputs related to a computing device. For example, this may be via a touchscreen, keyboard, mouse, microphone, infra-red controller, Bluetooth and/or Wi-Fi controller of the computing device 900. The input circuitry 904 transmits 906 the user interface input to the control circuitry 908.

The control circuitry 908 comprises a type identification module 910, a recommendation module 914, an action identification module 918 and an action performing module 924. The user interface input is transmitted 906 to the type identification module 910. At the type identification module 910, a type associated with a content item and/or a segment of a content item is identified. The type is transmitted 912 to the recommendation module 914, where a recommendation is identified based on the received type. The recommendation is transmitted 916 from the recommendation module 914 to the action identification module 918, where an action is identified based on the received recommendation. The identified action is transmitted 920 to the output circuitry 922, where the action performing module 924 performs the received action.

FIG. 10 shows a flowchart of illustrative steps involved in dynamically referring to related media content items, in accordance with some embodiments of the disclosure. Process 1000 may be implemented on any of the aforementioned computing devices (e.g., computing device 102, 202, 304, 404, 504, 604, 704, 802). In addition, one or more actions of the process 1000 may be incorporated into or combined with one or more actions of any other process or embodiments described herein.

At 1002, a content item is generated for output. For example, a smart television may generate a movie for display. At 1004 an input is associated with the content item. For example, the smart television may receive a fast-forward command. At 1006, it is determined whether to identify a recommendation in response to the input. For example, if the input comprises muting the smart television, then it may not be appropriate to continue with the process, and the content item continues being generated for output 1002. Otherwise, at 1008, a type associated with the first content item is identified. For example, a user may have watched comedy segments of the content item and be fast-forwarding a drama segment. In this example, the identified type may be comedy, as this corresponds to the segments that the user has been watching. At 1010, it is determined whether a recommendation can be identified based on the type. For example, if the type is comedy and no comedy content items are available, then it may not be possible to identify a recommendation. In this case, the content item continues being generated for output 1002. Otherwise, at 1012, a recommendation is identified. For example, the recommendation may be for a related comedy content item. At 1014, it is determined whether an action can be identified based on the recommendation. For example, if an OTT application cannot receive a recommendation to display due to work issues, an action may not be identified. In this case, the content item continues being generated for output 1002. Otherwise, at 1016 the action is identified, and at 1018, the action is performed.

In some examples, an application running on a computing device, such as an application associated with an OTT service, may keep track of a watchlist associated with a user profile and the content item being generated for output. If the watchlist does not contain any content items and/or the content item has finished, the application may raise a first flag. In addition, the application may track a browsing and/or search history associated with the user profile and identify where the browsing and/or search history relates to content items. For example, a search may be related to identifying a new content item to consume. Tracking the browsing and/or search history may comprise identifying items related to browsing a catalog of content items and trailer(s) for content items, consuming an initial episode(s) of a series of content items, checking reviews associated with content items and/or the presence of content items on websites, such as the Internet Movie Database (IMDB). The application may keep track of a time associated with a profile searching for new shows to watch. Each of these events may have a score associated with it and if the score reaches, for example, a threshold level, a second flag may be raised by the application. If a content item associated with a user profile is re-consumed, and if the first and second flags have been raised, this may indicate that a user associated with the profile has not been able to find any new content items to consume, despite a desire to. In addition, the application may monitor a user's watching pattern to increase a confidence level associated with whether a user associated with the profile has been unable to find new content items to consume. For example, the user profile may indicate binge watching or, for example, a daily pattern where content is consumed for an hour daily or, for example, an irregular watching pattern. If a user profile indicates that a previously consumed content item is re-consumed in a similar manner, a third flag may be raised by the application. If all three flags are raised, this may indicate a high probability that a user has been unsuccessful in finding new content items to consume, despite a desire to do so. In response to this, the application may aggressively promote new content items and/or aggressively recommend content items to consume. For example, a recommendation may comprise a promotion for a new and/or related content item to the content item that is being re-consumed. Based on this recommendation, the promotion may be inserted into the content item that is being re-consumed.

If a user profile indicates that a content item is being re-consumed, it is possible that a user may not find all segments of the content item worth re-consuming. For example, a user is likely to consume segments of a content item that they find interesting. The application can determine this by analyzing a user profile, "likes" generated via a user profile and/or characters, genres and/or types of segment that a user profile indicates a preference for. For example, based on a user profile and previously consumed pattern, the application can predict if a user profile is going to consume all segments of a content item or is going to skip certain segments, such as family segments. If, for example, the application determines that a user is going to skip such family segments, a recommendation for content promotion may be generated. Based on this recommendation, the promotion may be inserted in place of the family segments of a content item that is being consumed.

An aggressiveness of content promotion may be determined via the application. For example, as the aggressiveness of content promotion increases, more segments may be replaced to recommend content items, recommendations may be more personalized and/or more similar content may be recommended. The aggressiveness of content promotion may be increased in response to the number of times that a user profile has consumed a content item.

When all three of the aforementioned flags are raised, the recommendation can comprise supplemental content and/or detailed content for segments of interest. The recommendation may comprise a summary of some earlier skipped segments. Based on the recommendation, the supplemental content, and/or detailed content, and/or summary may be inserted into the content item that is being consumed. Even though the user is re-consuming a content item, the user may have some new content to watch (for example, the supplemental content). For example, additional scenes that did not make it to final cut may be inserted into the content item. In another example, similar scenes from related content items may be inserted into the content item.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   accessing a user profile associated with a content delivery service;
   identifying, based on data associated with the user profile, that:
      a watchlist does not contain any content items; and
      a historic access count associated with a first content item is larger than a first threshold;
   setting, based on the watchlist not containing any content items and the access count being larger than the first threshold, a flag;
   receiving, associated with the content delivery service:
      a plurality of search queries; and
      a plurality of browsing events associated with a content item catalogue;
   tracking:
      a time associated with receiving the plurality of search queries; and
      a number of the received browsing events;
   generating, based at least in part on the tracked time and the tracked number, a score;
   receiving, via the content delivery service, the first content item;
   receiving a first input to skip a segment of the first content item;
   determining, based at least in part on the set flag and the score, a first confidence level associated with a need for a recommendation for a second content item;
   identifying that the first confidence level is below a first threshold confidence level;
   accessing a watch pattern associated with the user profile;
   revising, based on the watch pattern, the first confidence level to generate a second confidence level;
   identifying that the second confidence level is above the first threshold confidence level;

identifying a type associated with the skipped segment of the first content item;
identifying the recommendation for the second content item based on the type associated with the skipped segment of the first content item;
determining whether the second confidence level is at or above a second threshold confidence level;
if the second confidence level is below the second threshold confidence level, generating, for display at a first computing device, the recommendation for the second content item; and
if the second confidence level is at or above the second threshold confidence level:
requesting the second content item;
receiving the second content item;
caching, at the first computing device, the received second content item; and
generating, for display at the first computing device, the second content item.

2. The method of claim 1, wherein:
the recommendation is an interactive recommendation; and
the method further comprises, on receiving a second input associated with the interactive recommendation at the first computing device, generating the second content item for output at the first computing device.

3. The method of claim 1, further comprising:
receiving, at the first computing device, a manifest file, wherein the manifest file comprises a link to the recommendation; and
requesting the recommendation, via the link, at the first computing device.

4. The method of claim 1, wherein:
a second computing device is associated with the first computing device;
receiving the first input associated with the first content item further comprises receiving the first input at the second computing device to request the first content item; and
the method further comprises generating a list of content items associated with the recommendation.

5. The method of claim 1 wherein:
receiving the first input associated with the first content item further comprises receiving the first input corresponding to a plurality of content items;
identifying the type further comprises identifying the type associated with at least a subset of the plurality of content items.

6. The method of claim 1, further comprising:
receiving a second input associated with the first content item;
analyzing the second input associated with the first content item to determine the content delivery service associated with the first content item;
transmitting at least a part of the second input to a profile associated with the content delivery service; and wherein:
identifying the recommendation based on the type further comprises identifying the recommendation based on the profile and the content delivery service.

7. The method of claim 1, further comprising:
receiving a second input;
transmitting at least a part of the second input to a plurality of content delivery services;
receiving responses from each of at least a subset of the plurality of content delivery services;
aggregating the responses at the first computing device; and wherein:
identifying the recommendation based on the type comprises identifying the recommendation based on the aggregated responses in addition to the type.

8. The method of claim 1, wherein the recommendation is a first recommendation, the method further comprising:
receiving a second input;
transmitting at least a part of the second input to a plurality of content delivery services;
receiving, at a bidding platform, a bid to recommend the second content item from at least a subset of the plurality of content delivery services; and wherein:
identifying the recommendation further comprises identifying the recommendation based on the received bid; and
generating a second recommendation for the second content item for output at the first computing device.

9. A system comprising:
a communication port;
a memory storing instructions; and
control circuitry communicably coupled to the memory and the communication port and configured to execute instructions to:
access a user profile associated with a content delivery service;
identify, based on data associated with the user profile, that:
a watchlist does not contain any content items; and
a historic access count associated with a first content item is larger than a first threshold;
set, based on the watchlist not containing any content items and the access count being larger than the first threshold, a flag;
receive, associated with the content delivery service:
a plurality of search queries; and
a plurality of browsing events associated with a content item catalogue;
tracking:
a time associated with receiving the plurality of search queries; and
a number of the received browsing events;
generating, based at least in part on the tracked time and the tracked number, a score;
receive, via the content delivery service, the first content item;
receive a first input to skip a segment of the first content item;
determine, based at least in part on the set flag and the score, a first confidence level associated with a need for a recommendation for a second content item;
identify that the first confidence level is below a first threshold confidence level;
access a watch pattern associated with the user profile;
revise, based on the watch pattern, the first confidence level to generate a second confidence level;
identify that the second confidence level is above the first threshold confidence level;
identify a type associated with the skipped segment of the first content item;
identify the recommendation for the second content item based on the type associated with the skipped segment of the first content item;
determine whether the second confidence level is at or above a second threshold confidence level;

if the second confidence level is below the second threshold confidence level, generate, for display at a first computing device, the recommendation for the second content item; and
if the second confidence level is at or above the second threshold confidence level:
request the second content item;
receive the second content item;
cache, at the first computing device, the second content item; and
generating, for display at the first computing device, the second content item.

10. The system of claim 9, wherein:
the recommendation is an interactive recommendation; and
the control circuitry is further configured to, on receiving a second input associated with the interactive recommendation at the first computing device, generate the second content item for output at the first computing device.

11. The system of claim 9, wherein the control circuitry is further configured to:
receive, at the first computing device, a manifest file, wherein the manifest file comprises a link to the recommendation; and
request the recommendation, via the link, for output at the first computing device.

12. The system of claim 9, wherein the control circuitry is further configured to associate a second computing device with the first computing device; and wherein:
the control circuitry configured to receive the first input associated with the first content item is further configured to receive the first input at the second computing device to request the first content item; and
the control circuitry is further configured to generate a list of content items associated with the recommendation.

13. The system of claim 9, wherein:
the control circuitry configured to receive the first input associated with the first content item is further configured to receive the first input corresponding to a plurality of content items; and
the control circuitry configured to identify the recommendation is further configured to identify the recommendation based on at least a subset of the plurality of content items.

14. The system of claim 9, wherein the control circuitry is further configured to:
receive a second input associated with the first content item;
analyze the second input associated with the first content item to determine the content delivery service associated with the first content item;
transmit at least a part of the second input to a profile associated with the content delivery service; and wherein:
the control circuitry configured to identify the recommendation based on the type is further configured to identify the recommendation based on the profile and on the second input.

15. The system of claim 9, wherein the control circuitry is further configured to:
receive a second input;
transmit at least a part of the second input to a plurality of content delivery services;
receive responses from each of at least a subset of the plurality of content delivery services;
aggregate the responses at the first computing device; and wherein:
the control circuitry configured to identify the recommendation based on the type is further configured to identify the recommendation based on the aggregated responses in addition to the type.

16. The system of claim 9, wherein:
the recommendation is a first recommendation;
the control circuitry is further configured to receive a second input;
the control circuitry is further configured to transmit at least a part of the second input to a plurality of content delivery services;
the control circuitry is further configured to receive, at a bidding platform, a bid to recommend the second content item from at least a subset of the plurality of content delivery services;
the control circuitry configured to identify the recommendation is further configured to identify the recommendation based on the received bid; and
the control circuitry is further configured to generate a second recommendation for the second content item for output at the first computing device.

* * * * *